Patented Dec. 27, 1938

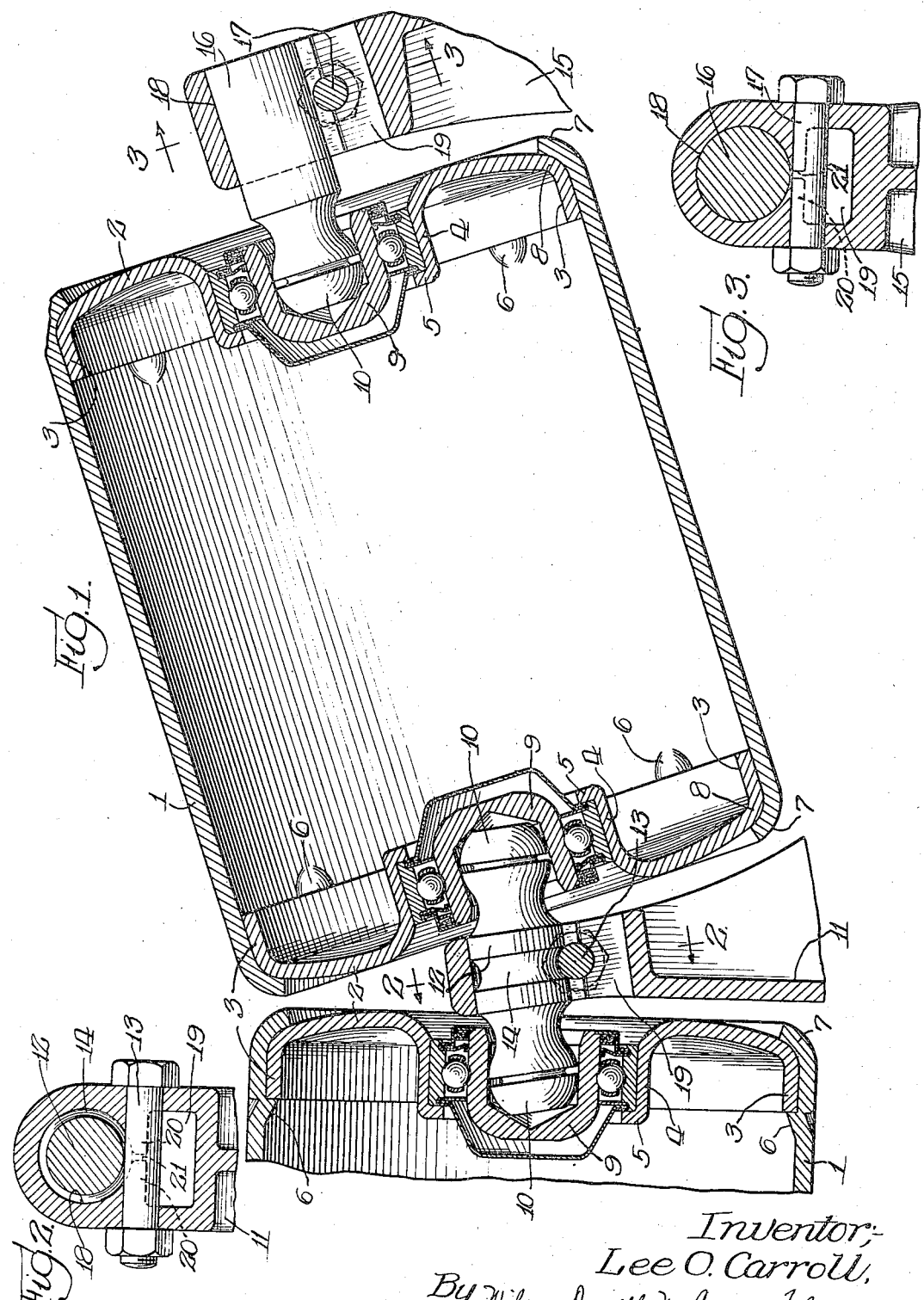

2,141,810

UNITED STATES PATENT OFFICE 2,141,810

ROLL SHAFT SUPPORT

Lee O. Carroll, South Bend, Ind., assignor to Dodge Manufacturing Corporation, Mishawaka, Ind., a corporation of Indiana Application December 16, 1935, Serial No. 54,570

7 Claims. (Cl. 308—20)

This invention relates to conveyor rolls and idlers, and more particularly to the mounting of the idler rolls. The invention provides improved shaft-clamping supports for shafts on which the bearings of the idler rolls are mounted, these improved supports offering practical advantages as hereinafter indicated.

The invention will be described with reference to the accompanying drawing and will be particularly pointed out and defined in the claims following the description.

In said drawing:

Fig. 1 is a fragmentary view in longitudinal vertical section of a portion of a conveyor idler having roll-supporting standards embodying the invention;

Fig. 2 is a detail cross section taken on the line 2—2 of Fig. 1, looking in the direction of the arrows; and Fig. 3 is a detail cross section taken on the line 3—3 of Fig. 1, looking in the direction of the arrows.

The conveyor idler shown is of the familiar type wherein conveyor rolls are arranged on relatively inclined axes to provide a troughing support for a belt conveyor. As usual in such idlers, the conveyor rolls are supported by intermediate standards and end standards, each of the intermediate standards extending into the gap between a pair of adjacent rolls and supporting the adjacent ends of such pair of rolls, while the end standards support the outer ends of the outer rolls. Only one of the outer inclined rolls and the adjacent end portion of the middle horizontal roll, together with the upper parts of supporting standards for these rolls, appear in the fragmentary view constituting the main figure of the drawing. In the specific construction shown, each conveyor roll comprises a cylindrical shell 1 formed from drawn seamless metal tubing, and pressed steel end plates 2 having peripheral flanges 3 and central tubular hub portions 4 providing bearing sockets. The end plates 2 are fitted in the ends of the shell with their flanges 3 extending inwardly and abutting against lugs 6 which are formed by punching the shell inwardly from the outside so as to shear the metal along lines at right angles to the roll axis. The ends of the shell are pressed over the end plates to lock them in position, this pressing operation forming the rounded shell end portions 7 engaging over the rounded corners 8 of the end plates. However this specific roll construction is immaterial to the present invention, and is not herein claimed.

The rolls are equipped with suitable bearing units which are pressed into the central hub portions of the end plates against the shoulders provided by the flanges 5. For relatively inexpensive installation, it is desirable to use sealed grease-packed ball bearings and to omit provision for supplying additional lubrication. Such bearings packed with grease in the factory are supplied by the bearing industry. If they should wear out before the roll wears out, they can be pulled out from the end plates with a suitable tool and can be readily replaced. In the construction shown the inner race members of the bearing units are constructed as socket members 9 which receive and are supported on the ball-shaped ends 10 of stub shafts carried by the supporting standards. No claim for such bearing units per se nor for the mounting of such units on ball-shaped ends of stub shafts is made herein, since the general mode of mounting the rolls is broadly old.

As shown, the intermediate standard 11 carries the double-headed stub shaft 12 on the ball-shaped ends of which are respectively mounted the roll bearings in adjacent ends of adjacent rolls; said stub shaft 12 passing through a hole or shaft bore in the standard and being clamped therein by the bolt 13 which engages a circumferential groove 14 in said stub shaft to position it and to prevent it from slipping endwise. The end standard 15 carries the longer single-headed stub shaft 16 on the ball-shaped end of which is mounted the adjacent roll bearing of an outer inclined roll of the idler; said stub shaft passing through said end standard and being clamped by the bolt 17. The portions of the stub shafts in the standards are of a diameter at least as large as the ball-shaped ends thereof, so that the stub shafts can be passed through or withdrawn from the standards for assembly or disassembly. It will be noted that while the stub shaft 12 is held in fixed position in the intermediate standard by engagement of the clamping bolt 13 with the groove 14, the other stub shaft 16 which engages the end standard is sufficiently longer to be held in engagement solely by the clamping action. This is to allow a certain manufacturing tolerance in the assembly of the conveyor rolls and supports, and the taking up of necessary adjustments through the end supporting devices.

Reference will now be made to an important improvement in respect to the supporting standards. Heretofore it has been common practice to make these standards with somewhat oversized holes for the stub shafts and with the upper ends of the standard split, the split halves of the upper ends of the standards being drawn together by bolts to clamp the stub shafts tightly in the standards. In this prior practice the clamping bolts have been arranged above the shaft, which is objectionable particularly in the case of the intermediate standards inasmuch as the space for the accommodation of the standards is quite limited.

In the construction shown in the drawing, the standards are not split, but they are formed just below the shaft bores 18 with cored chambers 19 of substantial size, separated from the shaft bores by divided webs 20 leaving gaps 21 connecting the shaft bores with the cored chambers below. The cored chambers 19 are shown as holes passing through the standards parallel with the shaft bores. The clamping bolts pass through the standards transversely of the shaft, below instead of above the shafts, the bolt 13 being located to engage the groove 14 in the stub shaft 12 as already noted, and the bolt 17 in the end standard 15 being located clear of the stub shaft 16, which latter is intended to be longitudinally adjusted as required in assembling the idler. By virtue of the cored chambers, the necessary contraction of the shaft bores to clamp the stub shafts can be effected by tightening the clamp bolts, drawing toward one another the walls engaged by the bolt heads and nuts.

A particular advantage of the new form of standard shown herein is that since only an adequately thick wall surrounding the bored hole 18 is necessary, the standard does not need to extend any higher, whereas in the past where the casting above the shaft was split and had a bolt passed therethrough, the standard necessarily extended much higher than that shown in the drawing, relatively to the center line of the rollers. Therefore, in view of the fact that the intermediate standard, in accordance with this invention, need only extend above the shaft in the amount indicated, it will present no interference with the desired object of supporting the rollers close to their ends and bringing the adjoining ends of the rollers close together so that the conveyor belt may be supported adequately throughout its entire width. A further advantage in the construction described is that it gives a smooth rounded top for the supporting standards which will not be so prone to accumulate dirt as was the prior construction where the clamping bolt was arranged above the shaft and the upper end of the standard was split.

With the construction of standards described, it is possible even in ordinary gray cast iron standards to obtain a reasonable degree of flexibility, so that this type of standard could be made in cast iron. Using standards made as ordinary gray iron castings having shaft bores or holes of just enough larger diameter than the shafts to allow a reasonable slip fit between the shafts and the shaft bores, it is possible upon tightening the clamping bolts to contract the diameters of the shaft bores as much as three thousandths of an inch, sufficient to attain the clamping action desired, without exceeding the elastic limit of cast iron. It thus becomes entirely practicable to utilize gray iron castings for these standards without entailing the likelihood of frequent breakages due to the clamping action. Since the shaft bores in gray cast iron standards can be safely contracted to the extent above indicated, it is proposed in the case of standards of cast gray iron to make the shaft bores three thousandths of an inch larger in diameter than the shafts, which will give the necessary slippage to permit insertion of the stub shafts in the standards. If the standards should be manufactured as malleable iron castings, or as steel castings, then the construction described will allow for a considerable greater contraction and increase in the clamping action.

It will be understood that the drawing discloses for illustrative purposes the preferred form of the invention and that embodiments thereof in such modified forms as may be within the scope of the appended claims are contemplated.

What I claim as my invention, and desire to secure by Letters Patent, is:

1. A conveyor roll shaft support having an unsplit upper shaft-clamping portion embodying a shaft bore and subjacent recess and a gap in the web between said bore and recess, the walls of said portion being continuous around said bore and recess, and a clamping bolt arranged under and transversely of said shaft bore connecting opposite walls of said recess, the tightening of which will effect a sufficient contraction of the shaft bore for the clamping of the shaft.

2. A conveyor roll shaft support comprising a supporting member having a transverse shaft bore in its upper end portion, the wall of said bore being longitudinally divided by a bottom gap and continuous from side to side of said gap, said member having at opposite sides of the vertical plane of the axis of said bore spaced walls integral with and connected by the wall of said bore, said spaced walls being integral with and rigidly connected by a subjacent part of said member, and a clamping bolt arranged transversely of and under the shaft for drawing inwardly said spaced walls for contracting the wall of said bore to grip the shaft.

3. A conveyor roll shaft support comprising a supporting member having spaced walls rising from and integral with and rigidly connected by a subjacent part of said support, a top wall integral with and connecting said spaced walls, projections integral with and extending inwardly from said spaced walls and cooperating with said top wall to provide a shaft holder, there being a space between said projections, said spaced walls adapted to be drawn inwardly for contracting said holder to grip the shaft, and a clamping bolt for effecting such contraction arranged transversely of and under the shaft.

4. A conveyor roll shaft support having an unsplit upper shaft-clamping portion integral with the immediately subjacent part of said support, said upper portion comprising spaced front and back walls and connecting top and bottom walls all in an integral body of metal, said front and back walls having inwardly extending projections spaced one from the other, the inner surface of the top wall and upper surfaces of said projections providing a shaft bore longitudinally divided by the gap between said projections, and a clamping bolt arranged under and transversely of the shaft for drawing inwardly said front and back walls to contract the shaft bore to grip the shaft.

5. A conveyor roll shaft support having an upper shaft-clamping portion and comprising a casting cored in said upper portion to provide a shaft bore and recess thereunder, the wall of said shaft bore being longitudinally divided by a bottom gap connecting said bore and recess and being continuous from side to side of said gap, said cored portion of the casting being by virtue of said recess and gap sufficiently contractible transversely of the vertical plane of the axis of the shaft bore for contracting the wall of the shaft bore to grip the shaft, and a clamping bolt for effecting such contraction arranged transversely of and under the shaft.

6. A conveyor roll shaft-supporting member comprising a casting cored to provide a shaft bore and recess adjacent to and parallel with said bore, there being a continuous wall around said bore and recess but the wall of said bore being longitudinally divided by a gap connecting said bore and recess, the cored portion of said casting being by virtue of said recess and gap sufficiently contractible transversely of the plane of longitudinal centers of the bore and recess for contracting the wall of said bore to grip the shaft, and a clamping bolt for effecting such contraction arranged transversely of said bore at the same side of the shaft as said recess.

7. A conveyor roll shaft support comprising a supporting member having an unsplit upper recessed portion with a smooth rounded top, said portion embodying a bore for a transversely disposed shaft with a longitudinal gap at the bottom of said bore and in the region of said gap being sufficiently contractable transversely of a vertical plane through the axis of the bore to permit contraction of said bore to clamp the shaft, and a clamping bolt for effecting such contraction arranged transversely of and immediately under the shaft.

LEE O. CARROLL.